(12) United States Patent
Kroon et al.

(10) Patent No.: US 7,406,327 B2
(45) Date of Patent: Jul. 29, 2008

(54) SYSTEM THAT ADAPTS POWER FOR MINIMIZING THE TOTAL AMOUNT OF TRANSMITTED POWER WITHIN A WIRELESS COMMUNICATIONS NETWORK AND RELATED METHOD

(75) Inventors: Jeffrey Kroon, Canandaigua, NY (US); Mark W. Thompson, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 674 days.

(21) Appl. No.: 11/148,845

(22) Filed: Jun. 9, 2005

(65) Prior Publication Data

US 2006/0281483 A1    Dec. 14, 2006

(51) Int. Cl.
*H04Q 7/20* (2006.01)
(52) U.S. Cl. ............................ 455/522; 455/69; 455/68; 455/501; 455/500; 455/67.11; 370/345; 370/346; 370/347; 370/328; 370/329
(58) Field of Classification Search ................. 455/522, 455/69, 500, 67.11, 67.13, 68, 70, 550.1, 455/426.1, 426.2, 445, 422.1, 403, 502; 370/337, 370/329.328, 345, 346, 347

See application file for complete search history.

(56) References Cited

U.S. PATENT DOCUMENTS

| | | | |
|---|---|---|---|
| 7,218,623 B1 * | 5/2007 | Proctor, Jr. .................. 370/335 |
| 2001/0046877 A1 * | 11/2001 | Ohkubo et al. .............. 455/522 |
| 2002/0031105 A1 * | 3/2002 | Zeira et al. .................. 370/337 |
| 2002/0172186 A1 | 11/2002 | Larsson ...................... 370/349 |
| 2003/0184433 A1 | 10/2003 | Zalitzky et al. ........ 340/310.06 |
| 2004/0086058 A1 | 5/2004 | Eckhardt et al. ............ 375/295 |
| 2004/0103278 A1 | 5/2004 | Abhishek et al. ............ 713/160 |
| 2004/0151145 A1 | 8/2004 | Hammerschmidt ......... 370/338 |
| 2005/0032478 A1 | 2/2005 | Stephens et al. ......... 455/67.11 |

* cited by examiner

*Primary Examiner*—Keith T Ferguson
(74) *Attorney, Agent, or Firm*—Allen, Dyer, Doppelt, Milbrath & Gilchrist, P.A.

(57) ABSTRACT

A system adapts power for minimizing the total amount of transmitted power in a wireless communications network. A transmit station transmits a communications signal requesting a response from receiving mobile stations. A plurality of the mobile stations receives the communications signal and each evaluates the signal reception, such as the signal-to-noise ratio or transmitted power. Each mobile station responds by transmitting a communications signal back to the transmit station in a specific time slot as a function of the signal reception to allow the transmit station to adapt its power based on the time slot of the communications signals received from respective mobile stations. This minimizes the total amount of power transmitted by the wireless communications network.

28 Claims, 3 Drawing Sheets

SYSTEM THAT ADAPTS POWER FOR MINIMIZING THE TOTAL AMOUNT OF TRANSMITTED POWER WITHIN A WIRELESS COMMUNICATIONS NETWORK AND RELATED METHOD

FIELD OF THE INVENTION

The present invention relates to wireless communications systems and, more particularly, the present invention relates to wireless communications systems that use adaptive power techniques.

BACKGROUND OF THE INVENTION

Some multi-band or other tactical radios operate in the high frequency (HF), very high frequency (VHF) (for satellite communications), and ultra high frequency (UHF) bands. The range of these multi-band tactical radios can operate over about 2 through about 512 MHz frequency range. Next generation radios will probably cover about 2.0 to about 2,000 MHz (or higher) to accommodate high data rate waveforms and less crowded frequency bands. This high frequency transmit mode is governed by standards such as MIL-STD-188-141B, while data modulation/demodulation is governed by standards such as MIL-STD-188-110B, the disclosures which are incorporated by reference in their entirety.

UHF standards, on the other hand, provide different challenges over the 225 to about 512 MHz frequency range, including short-haul line-of-sight (LOS) communication and satellite communications (SATCOM) and cable. This type of propagation can be obtained through different weather conditions, foliage and other obstacles making UHF SATCOM an indispensable communications medium for many agencies. Different directional antennas can be used to improve antenna gain and improve data rates on the transmit and receive links. This type of communication is typically governed in one example by MIL-STD-188-181B, the disclosure which is incorporated by reference in its entirety. This standard specifies a family of constant and non-constant amplitude waveforms for use over satellite links.

The joint tactical radio system (JTRS) implements some of these standards and has different designs that use oscillators, mixers, switchers, splitters, combiners and power amplifier devices to cover different frequency ranges. The modulation schemes used for these types of systems can occupy a fixed bandwidth channel at a fixed carrier frequency or can be frequency-hopped. These systems usually utilize memory-less modulations, such as a phase shift keying (PSK), amplitude shift keying (ASK), frequency shift keying (FSK), quadrature amplitude modulation (QAM), or modulations with memory such as continuous phase modulation (CPM) and combine them with a convolutional or other type of forward error correction code.

These systems often use a number of base station segments that are operative with HF and VHF communications nets and often ad-hoc communications networks in which a plurality of N mobile radios are located on a terrain, typically each moving with no fixed infrastructure. The ad-hoc networks typically require data communications and mobile voice and video that are cheap and reliable. There are different channel access schemes available, but often, there are problems with hidden terminals and some channel access mechanisms use a request-to-send (RTS) and a clear-to-send (CTS) approach to make communication more efficient. In this type of mechanism the channel access is typically receiver directed and uses complex state machines. It behaves similar to Carrier Sense Multiple Access (CSMA), but does not work for broadcast. Other channel access mechanisms may use a time slot approach. These mechanisms are transmitter directed and have good features of Time Division Multiple Access (TDMA), but often require synchronized clocks and a distributed algorithm. There would usually be some delay versus throughput tradeoff in different routing protocols such as a link state (SPF) or distance vector or on-demand routing protocols, and it can be optimized by caching, pruning or source routing. Sometimes there are hierarchical ad-hoc networks, using some degree of power control, and hierarchical link-state routing, and RTS/CPS wave forms.

Power efficient and covert communications systems typically require minimizing the amount of power transmitted in order to reduce the total power expenditure and minimize the probability that users will be detected. Some prior art techniques of adapting power within infrastructure-less networks, e.g., ad-hoc networks, for example, use periodic beacons to inform other users that power levels would use a request/response technique where all users in the communications network are required to respond to the request. The beacon technique requires the communications network to be continually transmitting information and as a result, either energy is expanded or the transmitter is more readily detected. In a request/response network, the complete communication network is transmitting in response to a request, thus expending unnecessary energy or increasing the probability of detection.

SUMMARY OF THE INVENTION

In view of the foregoing background, it is therefore an object of the present invention to provide a system or method that achieves power adaptation while minimizing the amount of power transmitted by an entire communications network.

In accordance with the present invention, a communications system uses power adaptation techniques for minimizing the total amount of transmitted power. The system includes a transmit station that transmits a communications signal, requesting a response from mobile stations. A plurality of mobile stations receive the communications signal from the transmit station and each mobile station evaluates the signal reception. In response to the received communications signal, the mobile stations transmit a communications signal back to the transmit station in a specific time slot as a function of signal reception in each of the mobile stations. The transmit station adapts its power output based on the time slot of the communication signals received from respective mobile stations and minimizes the total amount of transmitted power in the communications network.

In one aspect of the invention, the mobile stations are operative for evaluating signal reception based on the signal-to-noise ratio (SNR). The mobile stations can also be operative for evaluating signal reception based on the received power and the communications signal.

In another aspect of the invention, a request-to-send (RTS) signal is transmitted from the transmit station. A clear-to-send (CTS) signal is typically transmitted from the mobile stations that receive the communications signal from the transmit station. The time slots that are earlier in time correspond to mobile stations having the lowest quality of signal reception, such as a low signal-to-noise ratio or low power. Those time slots corresponding to mobile stations having the highest quality of signal reception are later in time. The system also can inhibit any transmission from a receiving mobile station when an earlier response from a receiving mobile station is indicative that other mobile stations have received communication signals and have a lower quality, i.e., power. Any transmission from a receiving mobile station can also be inhibited if the received signal strength and communications signal exceeds a predetermined threshold. Transmissions can also be inhibited even when the receiving mobile radio has received communication signals from other receiving mobile radios.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
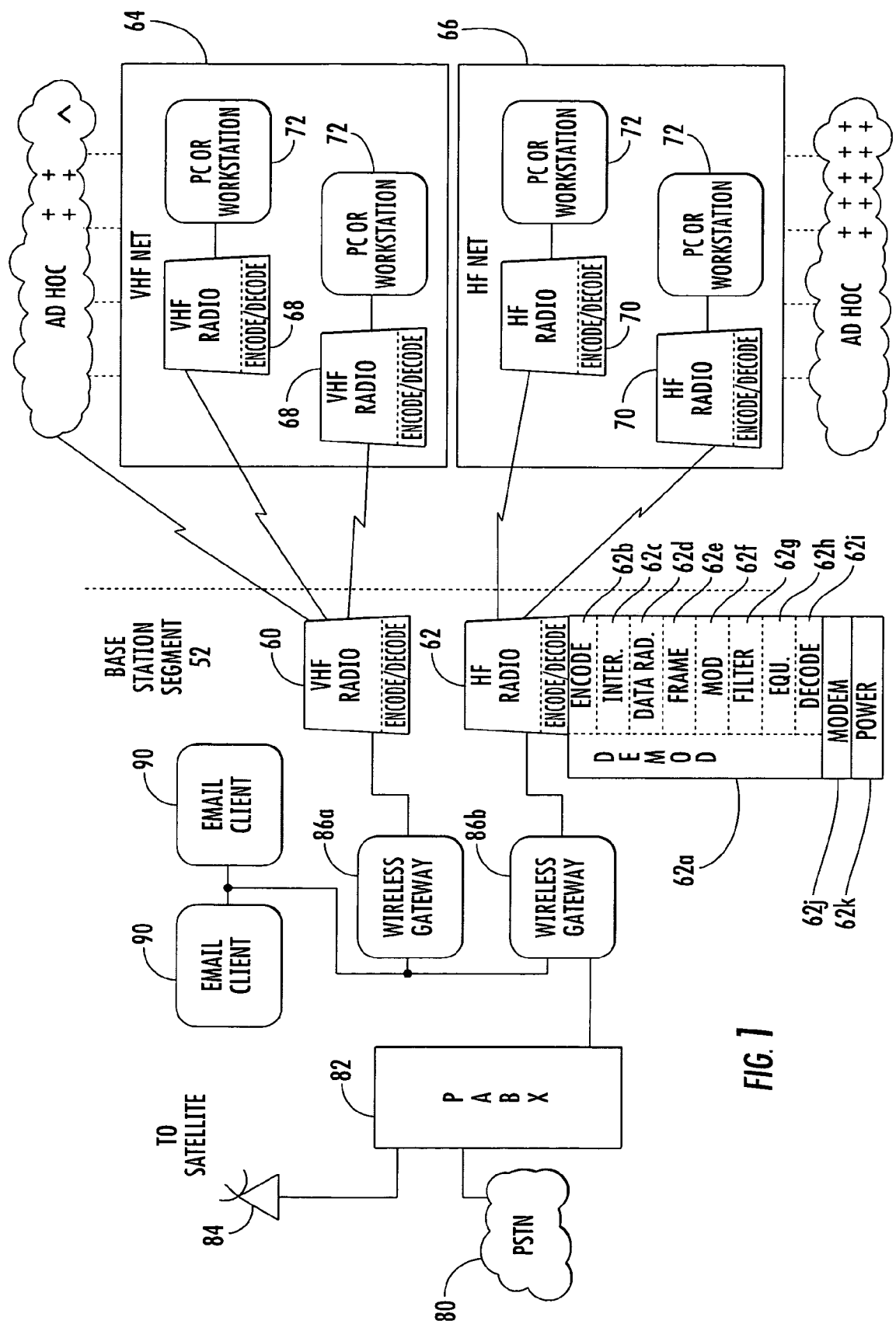
FIG. 1 is block diagram of a communications system that can be used for the present invention as a non-limiting example.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

The present invention advantageously minimizes the total amount of energy transmitted or expended to achieve communications in an infrastructure-less all informed wireless communications network. Such a network could be a mobile ad-hoc wireless communications system. Such examples of networks are set forth in commonly assigned U.S. Pat. Nos. 6,763,013; 6,754,192; and U.S. Patent Publication Nos. 2005/0053003 and 2004/0203820, the disclosures which are incorporated by reference in their entirety. The present invention allows the communication system to communicate with all devices, while also minimizing the output power of each transmission to the level necessary to maintain communication with a user receiving the least amount of signal.

When a Request-to-Send (RTS) is sent, it is not necessary that responses be error-free. It does not matter if Clear-to-Send (CTS) signals collide. Intentional avoidance, i.e., collision avoidance is not a concern. If two CTS or other communications signals arrive at the same time, it does not matter because there is nothing in the data that is used. The data is in a slot. This is in contrast to some prior art techniques that use information from a response. In one embodiment, the system does not have information in the response, but information is in the time, and it is embedded in whatever slot it is located.

In the system and method of the present invention, all mobile stations are "silent" until a specific transmission is required. When a transmission is desired, the transmit station sends out a short, robust burst signal requesting a transmission, for example, a request-to-send (RTS) data packet or communications signal. Each mobile station in the communications network receives this signal and evaluates the received signal reception, for example the signal-to-noise ratio or signal power. Each mobile station responds to the request by transmitting a robust wave form, for example, a clear-to-send (CTS) communications signal, such as a short data packet, in a specific time slot that is a function of the signal reception quality.

Time slots are arranged such that slots corresponding to a lower quality of signal reception, such as a low signal-to-noise ratio or low power, are earlier in time, and those corresponding to the higher quality signal reception, such as the higher signal-to-noise ratio or higher power levels, are later in time. Other mobile stations may inhibit their transmission knowing that other radios in the communications network have lower received signals. This minimizes the total amount of power transmitted by the communications network. If a mobile station has received the communications signal, i.e., the RTS having a signal strength that exceeds a predetermined threshold, then the mobile station may inhibit transmission regardless of whether it received signals from other stations. The burst signal as a CTS is one nonlimiting example that provides the original transmit station with information on the received power, based only upon the time slot. The transmit station then will adapt its power output to ensure that the radio that responded earliest, i.e., the radio with the weakest received signal, is capable of receiving the signal.

The present invention minimizes the amount of over-the-air transmissions that take place during an initial request for transmission. It also permits a transmit station to adapt its output power and accommodate the mobile station with the weakest signal. In the event when all mobile stations have received the initial communications signal, i.e., a RTS packet, at a signal level above the threshold, no mobile station in the communications network would transmit communications signals and responses, i.e., CTS signals or data packets. The transmit station would transmit at the lowest power level. This minimizes the total power transmitted by the overall network in cases where all mobile stations are within a close proximity and are receiving the transmission adequately.

For purposes of description, some background information of coding, interleaving, and an exemplary wireless, mobile radio communications system that can be used for the present invention is now set forth with regard to FIG. 1.

Figure 2:
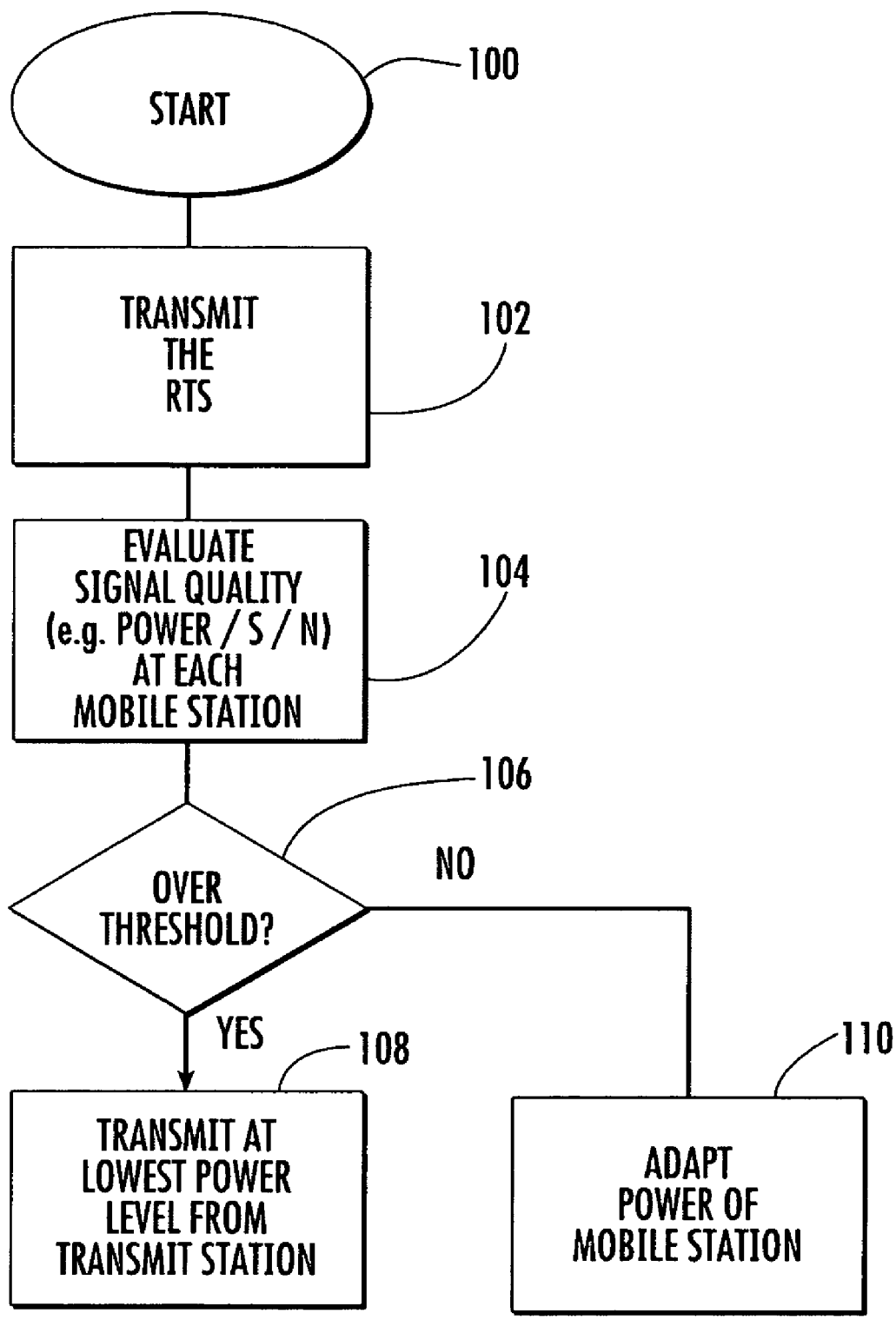
FIG. 2 is a high level flow chart showing basic steps used in practicing an example of the present invention.

For purposes of description only, a brief description of an example of a communications system that would benefit from the present invention is described relative to a non-limiting example shown in FIG. 2. This high level block diagram of a communications system 50 includes a base station segment 52 and wireless message terminals that could be modified for use with the present invention. The base station segment 52 includes a VHF radio 60 and HF radio 62 that communicate and transmit voice or data over a wireless link to a VHF net 64 or HF net 66, each which include a number of respective VHF radios 68 and HF radios 70, and personal computer workstations 72 connected to the radios 68,70. It should be understood that the HF or VHF networks include HF and VHF net segments that are infrastructure-less and operative as an ad-hoc communication network. Although UHF radios and net segments are not illustrated, these could be included.

The HF radio can include a demodulator circuit 62a and appropriate convolutional encoder circuit 62b, block interleaver 62c, data randomizer circuit 62d, data and framing circuit 62e, modulation circuit 62f, matched filter circuit 62g, block or symbol equalizer circuit 62h with an appropriate clamping device, deinterleaver and decoder circuit 62i modem 62j, and power adaptation circuit 62k as non-limiting examples. These and other circuits operate to perform the functions necessary for the present invention. Other illustrated radios, including all VHF mobile radios and transmitting and receiving stations can have similar functional circuits.

The base station segment 52 includes a landline connection to a public switched telephone network (PSTN) 80, which connects to a PABX 82. A satellite interface 84, such as a satellite ground station, connects to the PABX 82, which connects to processors forming wireless gateways 86a, 86b. These interconnect to the VHF radio 60 or HF radio 62, respectively. The processors are connected through a local area network to the PABX 82 and e-mail clients 90. The radios include appropriate signal generators and modulators.

An Ethernet/TCP-IP local area network could operate as a "radio" mail server. E-mail messages could be sent over radio links and local air networks using STANAG-5066 as second-generation protocols/waveforms, the disclosure which is hereby incorporated by reference in its entirety and, of course, preferably with the third-generation interoperability standard: STANAG-4538, the disclosure which is hereby incorporated by reference in its entirety. An interoperability standard FED-STD-1052, the disclosure which is hereby incorporated by reference in its entirety, could be used with legacy wireless devices. Examples of equipment that can be used in the present invention include different wireless gateway and radios manufactured by Harris Corporation of Melbourne, Florida. This equipment could include RF5800, 5022, 7210, 5710, 5285 and PRC 117 and 138 series equipment and devices as non-limiting examples.

These systems can be operable with RF-5710A high-frequency (HF) modems and with the NATO standard known as STANAG 4539, the disclosure which is hereby incorporated by reference in its entirety, which provides for transmission of long distance HF radio circuits at rates up to 9,600 bps. In addition to modem technology, those systems can use wireless email products that use a suite of data-link protocols designed and perfected for stressed tactical channels, such as the STANAG 4538 or STANAG 5066, the disclosures which are hereby incorporated by reference in their entirety. It is also possible to use a fixed, non-adaptive data rate as high as 19,200 bps with a radio set to ISB mode and an HF modem set to a fixed data rate. It is possible to use code combining techniques and ARQ.

FIG. 2 is a high level flowchart of an example of the steps that can be used in the system and method of the present invention. For purposes of description, the blocks begin in the 100 series. The process begins (block 100) and the transmit station will transmit the RTS (block 102). Any mobile station that receives the RTS will evaluate the RTS (block 104). A determination is made whether the signal is over the threshold (block 106) and if yes, any transmission by the transmit station will occur at the lowest power level (block 108). If the signal is not over the threshold, then adaptive power techniques occur (block 110).

Figure 3:
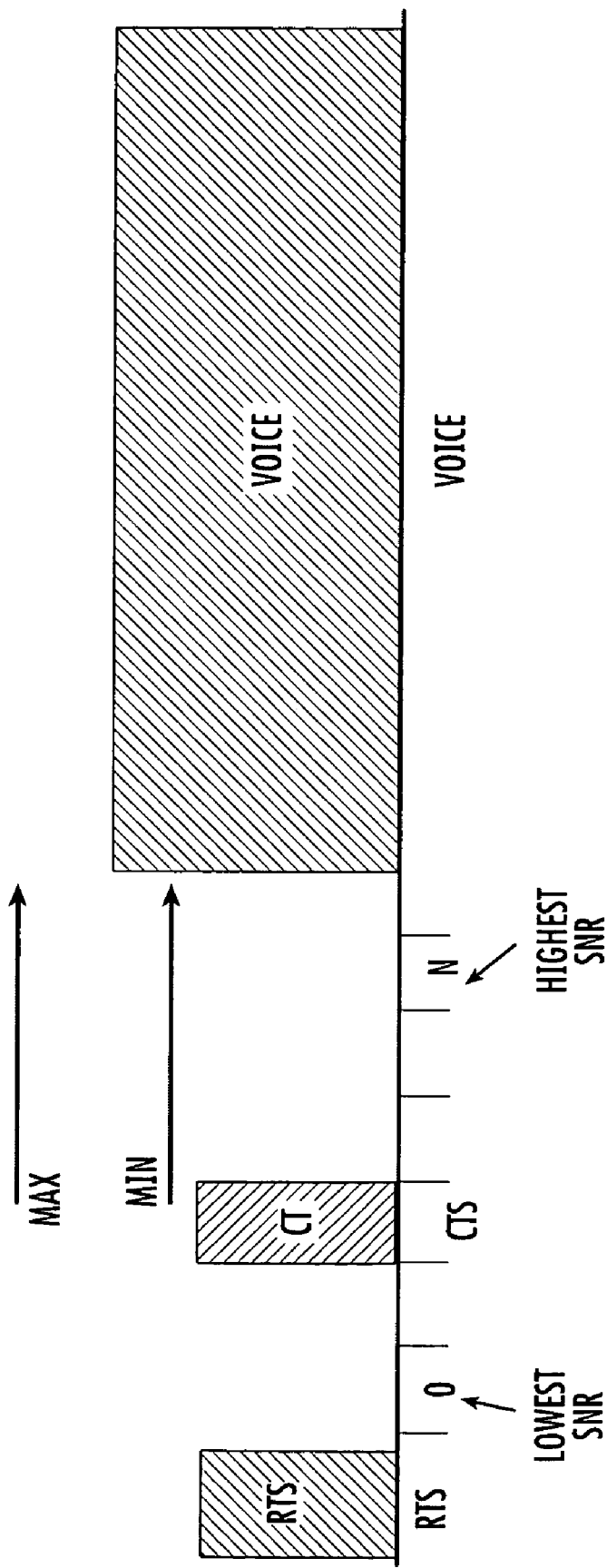
FIG. 3 is a graph showing an example of the RTS/CTS and message transmission process.

FIG. 3 is a graph showing the RTS/CTS and message transmission process. Time is shown along the horizontal axis and illustrates a time slotted protocol for the present invention. The first time slot corresponds to when the transmit station has sent out a request-to-send (RTS). The next time slot is reserved for a mobile station with the RTS at the lowest signal-to-noise ratio level such as corresponding to a very low power level. A plurality of stations can be included in this category. These stations respond. The next time slot and subsequent time slots are reserved for an ever-increasing signal-to-noise ratio corresponding to those mobile stations that receive the higher power or higher signal-to-noise ratio. Once that period of time is completed, the originating transmit station would transmit the voice or data transmission as indicated by the large data block.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A system that adapts power for minimizing the total amount of transmitted power within a wireless communications network comprising:
 a transmit station that transmits a communications signal requesting a response from mobile stations;
 a plurality of mobile stations that receive the communications signal from the transmit station, wherein each mobile station evaluates its signal reception and responds to the communications signal by transmitting a communications signal back to the transmit station in a specific time slot as a function of its signal reception to allow the transmit station to adapt its power output based on the time slots of the communications signals and minimize the total amount of transmitted power.

2. A system according to claim 1, wherein said transmit station and mobile stations comprise wireless or optical mobile stations.

3. A system according to claim 1, wherein said communications signals arrive substantially at the same time or at a different time.

4. A system according to claim 1, wherein the mobile stations are operative for evaluating signal reception based on the signal-to-noise ratio.

5. A system according to claim 1, wherein the mobile stations are operative for evaluating signal reception based on the received power of the communications signal.

6. A system according to claim 1, wherein the transmit station is operative for transmitting a Request to Send (RTS) signal.

7. A system according to claim 6, wherein each mobile station is operative for transmitting a Clear to Send (CTS) in response to the RTS signal.

8. A system according to claim 1, wherein the time slots are arranged such that time slots corresponding to mobile stations having the lowest quality of signal reception are earlier in time and those time slots corresponding to mobile stations having the highest quality of signal reception are later in time.

9. A system according to claim 1, wherein each mobile station is operative for inhibiting a transmission when an earlier response from a mobile station is indicative that other mobile stations have received communications signals that have a lower quality of signal reception.

10. A system according to claim 1, wherein each mobile station is operative for inhibiting a transmission if the received signal strength of a communications signal exceeds a predetermined threshold.

11. A system that adapts power for minimizing the total amount of transmitted power within a wireless communications network comprising:
 a transmit station that transmits a communications signal requesting a response from mobile stations;
 a plurality of mobile stations that receive the communications signal from the transmit station, wherein each mobile station evaluates its signal reception and responds to the communications signal by transmitting a communications signal back to the transmit station in a specific time slot as a function of its signal reception to allow the transmit station to adapt its power output based on the time slots of the communications signals, wherein if all mobile stations have received the communications signal at a signal level above a threshold, no response will be transmitted by mobile stations and the transmit station will transmit at its lowest power level allowing reception to all mobile stations to minimize the total amount of power transmitted within the wireless communications network.

12. A system according to claim 11, wherein the transmit station and mobile stations comprise wireless or optical mobile stations.

13. A system according to claim 11, wherein said communications signals arrive substantially at the same time or at a different time.

14. A system according to claim 11, wherein the mobile stations are operative for evaluating signal reception based on the signal-to-noise ratio.

15. A system according to claim 11, wherein the mobile stations are operative for evaluating signal reception based on the received power of the communications signal.

16. A system according to claim 11, wherein the transmit station is operative for transmitting a Request to Send (RTS) signal.

17. A system according to claim 16, wherein each mobile station is operative for transmitting a Clear to Send (CTS) signal in response to the RTS signal.

18. A system according to claim 11, wherein the time slots are arranged such that time slots corresponding to mobile stations having the lowest quality of signal reception are earlier in time and those time slots corresponding to mobile stations having the highest quality of signal reception are later in time.

19. A system according to claim 11, wherein each mobile station is operative for inhibiting a transmission when an earlier response from a mobile station is indicative that other mobile stations have received communications signals that have a lower quality of signal reception.

20. A system according to claim 11, wherein each mobile station is operative for inhibiting a transmission if the received signal strength of a communications signal exceeds a predetermined threshold.

21. A method for adapting power and minimizing the total amount of transmitted power within a wireless communications network, which comprises:
 transmitting from a transmit station a communications signal that requests a response;
 evaluating the signal reception within mobile stations that receive the communications signal;
 responding to the communications signal at each mobile station by transmitting a communications signal from each mobile station back to the transmit station in a specific time slot as a function of the quality of signal reception at a respective mobile station; and
 adapting power output of the transmit station based on the respective time slots of received communications signals to minimize the total amount of power transmitted within the wireless communications network.

22. A method according to claim 21, which further comprises evaluating the signal-to-noise ratio as indicative of the quality of the signal reception.

23. A method according to claim 21, which further comprises evaluating the received power as indicative of the quality of the signal reception.

24. A method according to claim 21, which further comprises transmitting a Request to Send (RTS) signal from the transmit station.

25. A method according to claim 24, which further comprises transmitting a Clear to Send (CTS) signal from a mobile station that received the communications signal from the transmit station.

26. A method according to claim 21, which further comprises arranging the time slots such that time slots corresponding to mobile stations having the lowest quality of signal reception are earlier in time and those time slots corresponding to mobile stations having the higher quality of signal reception are later in time.

27. A method according to claim 21, which further comprises inhibiting a transmission from a mobile station when an earlier response from a mobile station is received, indicative that other mobile stations have received communications signals that have a lower quality.

28. A method according to claim 21, which further comprises inhibiting a transmission from a mobile station if the received signal strength of a communications signal exceeds a predetermined threshold.

\* \* \* \* \*